T. L. & T. J. STURTEVANT.
CARBURETER.
APPLICATION FILED JULY 3, 1908.
961,423.
Patented June 14, 1910.
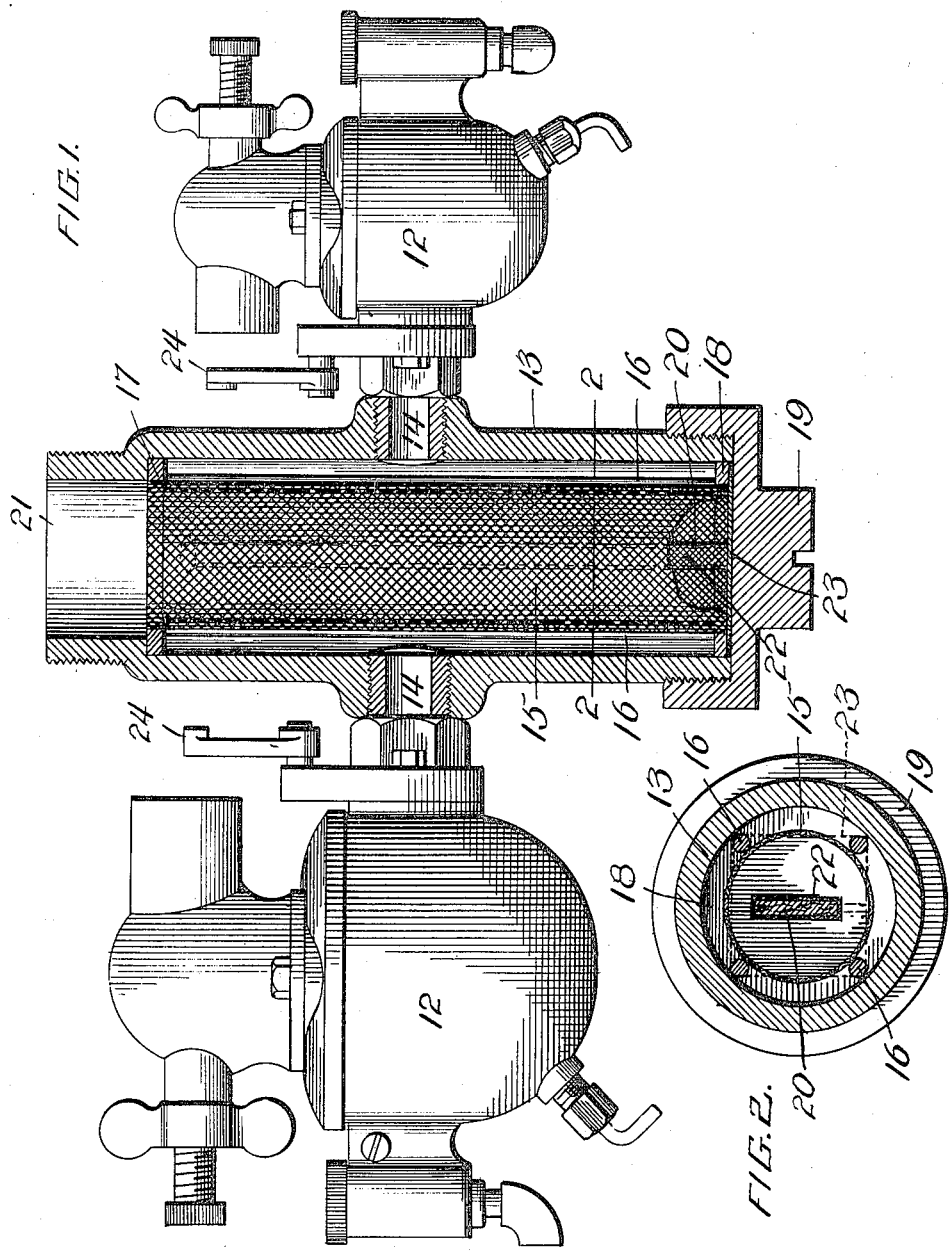

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, A CORPORATION OF MAINE.

CARBURETER.

961,423.   Specification of Letters Patent.   Patented June 14, 1910.

Application filed July 3, 1908. Serial No. 441,858.

*To all whom it may concern:*

Be it known that we, THOMAS L. STURTEVANT and THOMAS J. STURTEVANT, citizens of the United States, residing, respectively, at Quincy and Wellesley, in the county of Norfolk and State of Massachusetts, have invented or discovered certain new and useful Improvements in Carbureters, of which the following is a specification, reference being had therein to the accompanying drawings.

In the operation of carbureters or vaporizers for internal combustion engines or motors the liquid hydrocarbon is not always entirely vaporized as it emerges therefrom, and in such cases more or less of the hydrocarbon passes onward in the conduits to the engines or motors in a liquid state. Also in the operation of these carbureters, particularly when used in connection with motor vehicles, more or less dust or dirt is liable to be drawn into the carbureters at the air valves, and by accumulating in the passages is likely to clog the same more or less; and such dust and dirt finds its way, to a greater or less extent, to the engines or motors to the injury thereof.

The present invention has for its object to provide a carbureter with a catch basin device in the form of a trap or well which will catch and detain any surplus liquid hydrocarbon coming from the carbureter or vaporizer, as also to provide, in the chamber of such trap or well, a screen which will not only serve to assist in subdividing the surplus liquid into fine particles, for its more ready vaporization, but will also serve to detain dust or dirt which may pass through the carbureter, and thus exclude it from the passageway to the motor.

The present invention will preferably be embodied in an apparatus comprising two or more carbureters, which will preferably be of different sizes, such, for example, as the double carbureter apparatus shown and described in our U. S. Patent No. 871,741, granted Nov. 19, 1904; although the invention may also be used in connection with a single carbureter, as will be understood.
In the accompanying drawings, Figure 1 is an elevation, partly in section, of an apparatus embodying the present invention, and Fig. 2 is a cross section of the same on line 2—2 Fig. 1.
Referring to the drawings, 12 denotes the carbureters which will preferably be of different sizes, and which will be of any suitable construction, such, for example, as that of the well-known Schebler carbureter. The carbureters 12 are herein shown as being mounted directly on a catch-basin device consisting of a trap or well 13; said carbureters having outlets 14 discharging into the chamber of the said trap or well and at points considerably above the bottom of the latter, so that any surplus liquid hydrocarbon discharged from the carbureters will naturally flow or fall down into the lower part of said trap or well.

Within the chamber of the trap or well 13 is a fine mesh screen 15 which will preferably consist of fine wire cloth attached to a suitable frame preferably comprising vertical posts 16. If the screen wire is stiff enough no frame will be required. The said frame is held in the chamber of the trap or well between upper and lower washers 17 and 18. These washers are secured to the posts 16 and the washers and posts form the frame. The bottom of the well is closed by a screw plug or cap 19 which may be readily removed for the purpose of taking out the screen and cleaning the said trap or well. The cap or plug may be provided with a drip or drain faucet, if desired, to drain out any accumulation of surplus gasolene. The trap or well 13 provides a chamber which is independent of or additional to the mixing chambers of the carbureters 12, as will be obvious, and thus serves to insure a more perfect vaporization of the liquid hydrocarbon and a more perfect carbureting of the air mixed with such hydrocarbon, than would otherwise be possible.

To prevent the excessive accumulation of liquid hydrocarbon in the trap or well a suitable wick 20 is preferably placed therein inside of the screen 15. The said wick will serve to absorb and raise, by capillary action, the liquid accumulating in the bottom of the trap or well into such position that it can generally be sufficiently absorbed or vaporized by the gaseous currents passing from the carbureter to the exit passage 21 to the motor. In the form of our invention herein illustrated the wick 20 is stiffened, so as to be properly supported vertically, by being inclosed in a wire cloth frame or cover 22 attached at its bottom to a plate 23 resting on the plug 19 beneath the lower washer

18, so that the wick will be held down and properly sustained in such a position that it will not be displaced or raised by the gaseous currents passing through the trap or well. Any other suitable means for accomplishing this purpose may be adopted, if desired. The carbureters will also be provided, as is usual, with suitable regulating valves which may be operated by arms 24 properly connected to foot pedals or other regulating devices in any well-known manner; and the passage-way of the gaseous fuel to the engine will also preferably be provided with a suitable regulating device, as is common; but as these features form no part of the present invention they need not be herein further described.

From the foregoing it will be understood that any liquid hydrocarbon entering the chamber of the trap or well 13 will be more or less broken up into fine particles by coming in contact with and passing through the wire mesh screen 15, so as to be more readily vaporized; and that such portions of the liquid hydrocarbon as are not vaporized will trickle down the said screen or drop and be received in the lower part of the trap or well 13. The liquid hydrocarbon thus accumulating in the lower part of the trap will be raised by capillary action, through the medium of the wick 20, into such position as to be gradually vaporized in the upper part of the chamber of said trap or well, the said wick preferably extending to a considerable distance above the passageways 14, as shown in the accompanying drawing. It will also be obvious that the screen 15 will serve to arrest such particles of dust or dirt as may enter into the chamber of the trap or well from the carbureter or carbureters, and will thus prevent the onward passage of such particles of dust or dirt to the fuel passage 21 to the motor or engine. When it is desired to clean the trap or well, and the screen contained therein, the screw plug 19 may be removed, and the screen 15 and wick 20 may be readily taken out of the chamber of the trap or well when said plug is thus removed.

The invention is not to be understood as being limited to the details herein shown and described, as such details may be varied widely, within the province of mechanical skill, without departing from the spirit or scope of the invention.

It will, of course, be understood that the invention may be used in connection with a single carbureter or with a plurality thereof, and the screen device may also be used in connection with gas engines or motors as well as with vaporized fuel motors.

Having thus described our invention we claim and desire to secure by Letters Patent:

1. The combination with one or more carbureters or vaporizers, of a trap or well provided with a fuel discharge opening at its top and one or more openings in its side wall at a considerable distance above its bottom, so that the lower part of the chamber of the said trap or well is adapted to serve as a catch-basin for surplus fuel, and a fine mesh, vertically-disposed screen arranged in said chamber and opposite said opening or openings, the said trap or well providing a chamber which is independent of or additional to the mixing chamber or chambers of the carbureter or carbureters.

2. The combination with a carbureter or vaporizer, of a trap or well into which the said carbureter discharges, and which extends below the exit passage from the said carbureter, so as to be adapted to serve as a catch-basin for surplus liquid fuel, a fine mesh screen arranged in the chamber of said trap or well, and a wick vertically disposed in the chamber of said trap or well, and serving, by capillary action, to raise the liquid hydrocarbon accumulating in said trap or well into suitable position for vaporization.

3. The combination with a carbureter or vaporizer, of a trap or well into which the said carbureter discharges, and which extends below the exit passage from the said carbureter, so as to be adapted to serve as a catch-basin for surplus liquid fuel, a fine mesh screen arranged in the chamber of said trap or well, a wick vertically disposed in the chamber of said trap or well, and serving, by capillary action, to raise the liquid hydrocarbon accumulating in said trap or well into suitable position for vaporization, and means for securing said wick in said chamber and for supporting said wick vertically.

4. The combination with one or more carbureters or vaporizers, of a trap or well provided with a fuel discharge opening at its top and one or more openings in its side walls at a considerable distance above its bottom, so that the lower part of the chamber of the said trap or well is adapted to serve as a catch-basin for surplus liquid fuel, the said trap or well providing a chamber which is independent of or additional to the mixing chamber or chambers of the carbureter or carbureters, a fine mesh screen vertically disposed in the chamber of said trap or well and extending opposite the said opening or openings, so as to receive the incoming spray, and said trap or well having an open bottom and a removable part normally closing the bottom of said trap or well and which, when removed, permits of the insertion or removal of said screen from below.

5. The combination with a plurality of carbureters or vaporizers for liquid hydrocarbon, of a trap or well into which said carbureters may discharge, and which is adapted to serve as a catch-basin for surplus liquid, and a wick in the chamber of the said trap or well.

6. The combination with a plurality of carbureters or vaporizers for liquid hydrocarbon, of a trap or well into which said carbureters may discharge, and which is adapted to serve as a catch-basin for surplus liquid, a wick in the chamber of the said trap or well, and means for stiffening said wick to support it vertically.

7. The combination with a carbureter, of a catch-basin device into which said carbureter discharges, and a wick in the chamber of said catch-basin device and which wick is so disposed as to raise, by capillary action, surplus liquid from the lower part of said chamber into a position to be vaporized by passing gaseous currents.

8. The combination with a carbureter, of a catch-basin device into which said carbureter discharges, a wick in the chamber of said catch-basin device and which wick is so disposed as to raise, by capillary action, surplus liquid from the lower part of said chamber into a position to be vaporized by passing gaseous currents, and means for stiffening or supporting said wick.

9. The combination with a carbureter, of a catch basin or trap having a fuel discharge opening at its top and an open bottom and into which catch-basin or trap said carbureter discharges, a removable plug or cap normally closing said open bottom, a fine-mesh, vertically-disposed screen in the chamber of said catch-basin or trap, and a removable vertical frame insertible into said chamber through said open bottom and to which said screen is attached, said catch-basin or trap providing a chamber which is independent of or additional to the mixing chamber of the carbureter.

10. The combination with a carbureter, of a catch-basin or trap having a fuel discharge opening at its top and into which said carbureter discharges, a fine mesh, vertically disposed screen in the chamber of said catch-basin or trap, a vertically disposed frame to which said screen is attached, and a removable closure for the bottom of said catch-basin or trap, and which permits of the removal of said screen and its frame when necessary, said catch-basin or trap providing a chamber which is independent of or additional to the mixing chamber of the carbureter.

In testimony whereof we affix our signatures, in presence of two witnesses.

THOMAS LEGGETT STURTEVANT.
THOMAS JOSEPH STURTEVANT.

Witnesses:
W. H. ELLIS,
F. B. HECKER.